US011933238B2

(12) United States Patent
Kachi et al.

(10) Patent No.: US 11,933,238 B2
(45) Date of Patent: Mar. 19, 2024

(54) CONTROLLER FOR INTERNAL COMBUSTION ENGINE, CONTROL METHOD FOR INTERNAL COMBUSTION ENGINE, AND MEMORY MEDIUM

(71) Applicant: TOYOTA JIDOSHA KABUSHIKI KAISHA, Aichi-ken (JP)

(72) Inventors: Masahiro Kachi, Nagakute (JP); Takehiro Komatsu, Toyota (JP); Masanao Idogawa, Nagoya (JP); Takahiro Uchida, Okazaki (JP); Machiko Takahashi, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/165,263

(22) Filed: Feb. 6, 2023

(65) Prior Publication Data

US 2023/0250772 A1 Aug. 10, 2023

(30) Foreign Application Priority Data

Feb. 9, 2022 (JP) ................................ 2022-018497

(51) Int. Cl.
*F02D 41/06* (2006.01)
*F02D 41/38* (2006.01)

(52) U.S. Cl.
CPC ........... *F02D 41/065* (2013.01); *F02D 41/38* (2013.01); *F02D 2200/0616* (2013.01); *F02D 2200/101* (2013.01)

(58) Field of Classification Search
CPC .................. F02D 41/065; F02D 41/38; F02D 2200/0616; F02D 2200/101; F02D 41/3094; F02D 17/02; F02D 41/0002; F02D 41/008; F02D 2041/389; F02N 11/0844;

(Continued)

(56) References Cited

U.S. PATENT DOCUMENTS 7,949,461 B2 * 5/2011 Takahashi ............ F02D 41/065 123/406.27
2008/0092841 A1 * 4/2008 Takahashi ............ F02D 41/009 701/113

(Continued)

FOREIGN PATENT DOCUMENTS

JP 201395155 A 5/2013

*Primary Examiner* — Sizo B Vilakazi
(74) *Attorney, Agent, or Firm* — HAUPTMAN HAM, LLP

(57) ABSTRACT

A controller and a control method for an internal combustion engine, and a memory medium are provided. In a first combustion cylinder, first combustion is caused by control circuitry when the engine is restarted from a state where fuel combustion in cylinders is suspended. An automatic stopping process suspends the fuel combustion in the cylinders and controls a throttle valve to a closed state when a predetermined condition is satisfied. A first calculation process calculates an amount of fuel injected into the first combustion cylinder based on a position of the piston in the first combustion cylinder in a case where a rotation speed of a crankshaft obtained when the restart was requested is zero. A second calculation process calculates the injection amount based on the rotation speed in a case where the rotation speed obtained when the restart was requested is higher than zero.

6 Claims, 3 Drawing Sheets

(58) Field of Classification Search
CPC ........... F02N 11/0814; F02N 2200/022; F02N 2300/2002
USPC .............................. 123/198 F, 325, 332, 481
See application file for complete search history.

(56) References Cited

U.S. PATENT DOCUMENTS

| | | | | |
|---|---|---|---|---|
| 2008/0154484 | A1 * | 6/2008 | Takeyama ............. | F02D 41/065 701/113 |
| 2008/0257311 | A1 * | 10/2008 | Spicer ....................... | F01L 1/34 123/481 |

* cited by examiner

CONTROLLER FOR INTERNAL COMBUSTION ENGINE, CONTROL METHOD FOR INTERNAL COMBUSTION ENGINE, AND MEMORY MEDIUM

RELATED APPLICATIONS

The present application claims priority of Japanese Patent Application No. 2022-018497 filed Feb. 9, 2022, the disclosure of which is hereby incorporated by reference herein in its entirety.

BACKGROUND

1. Field

The present disclosure relates to a controller for an internal combustion engine, a control method for the internal combustion engine, and a memory medium.

2. Description of Related Art

Japanese Laid-Open Patent Publication No. 2013-095155 discloses an internal combustion engine that includes cylinders, an intake passage, an exhaust passage, pistons, a crankshaft, fuel injection valves, and a throttle valve. Each cylinder is a space for burning fuel. The intake passage draws intake air into the cylinders. The exhaust passage discharges exhaust gas from the cylinders. Each piston reciprocates in the corresponding cylinder. The crankshaft is rotated by the reciprocating motion of the pistons. Each fuel injection valve supplies fuel into the corresponding cylinder. The throttle valve is located in the intake passage. The throttle valve regulates the amount of intake air flowing through the intake passage.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The internal combustion engine disclosed in the above literature includes a controller that may suspend fuel combustion in the cylinders of the internal combustion engine and then execute a restarting process that restarts the internal combustion engine.

Conventionally, the restarting process of the internal combustion engine requires that the crankshaft be at rest as a prior condition. Thus, if the conventional restarting process is executed in a state where when the rotation speed of the crankshaft is not zero, the internal combustion engine is not always restarted in a favorable manner.

An aspect of the present disclosure provides a controller for an internal combustion engine. The controller includes control circuitry and is employed in the internal combustion engine. The internal combustion engine includes cylinders in which fuel is burned, an intake passage through which intake air is drawn, and an exhaust passage through which exhaust gas is discharged from the cylinders. The internal combustion engine further includes pistons each reciprocating in a corresponding one of the cylinders, a crankshaft that rotates as the piston reciprocates, fuel injection valves each supplying a corresponding one of the cylinders with fuel, and a throttle valve located in the intake passage to regulate an amount of the intake air flowing through the intake passage. The control circuitry is configured to restart the internal combustion engine from a state where fuel combustion in the cylinders is suspended. The cylinders include a first combustion cylinder in which first combustion is caused by the control circuitry when the internal combustion engine is restarted from the state where the fuel combustion in the cylinders is suspended. The control circuitry is configured to execute an automatic stopping process that suspends the fuel combustion in the cylinders and controls the throttle valve to a closed state when a predetermined condition is satisfied, a first calculation process that calculates an amount of fuel injected into the first combustion cylinder based on a position of the piston in the first combustion cylinder in a case where a rotation speed of the crankshaft obtained when the restart was requested is zero, and a second calculation process that calculates the amount of fuel injected into the first combustion cylinder based on the rotation speed in a case where the rotation speed obtained when the restart was requested is higher than zero.

Even during execution of the automatic stopping process, when the crankshaft is rotating, gas flows through the intake passage, the cylinders, and the exhaust passage in this order. The gas flowing through the intake passage, the cylinders, and the exhaust passage in this manner causes the pressure of gas on the downstream side of the intake passage, as viewed from the throttle valve, to tend to change in correspondence with the rotation speed of the crankshaft. This causes a change in the amount of intake air drawn into the first combustion cylinder when the internal combustion engine is restarted, and consequently causes a change in the amount of fuel that should be supplied to the first combustion cylinder. In the above configuration, the amount of fuel to be supplied to the first combustion cylinder that changes in correspondence with the rotation speed of the crankshaft is taken into account to calculate the amount of fuel injected into the first combustion cylinder. This ensures that the restart of the internal combustion engine is executed even if the crankshaft is rotating.

In the above configuration, N is an integer greater than or equal to 2. The cylinders may include a second combustion cylinder and an Nth combustion cylinder. The control circuitry may be further configured to execute an intermediate calculation process that calculates amounts of fuel injected into the second combustion cylinder to Nth combustion cylinder when restarting the internal combustion engine, and a normal calculation process that calculates amounts of fuel injected into (N+1)th and subsequent combustion cylinders. The control circuitry may be configured to set a value of the N used in the case where the rotation speed obtained when the restart was requested is higher than zero to be smaller than a value of the N used in the case where the rotation speed obtained when the restart was requested is zero.

In the above configuration, the mode of calculating the fuel injection amount is switched to the normal calculation process more quickly in the case where the rotation speed of the crankshaft obtained when the restart of the internal combustion engine was requested is higher than zero than when the rotation speed of the crankshaft is zero. That is, the restart of the internal combustion engine in which the amount of fuel injected is calculated to be relatively large ends quickly, so that the control of the internal combustion engine is returned to normal control. This reduces the amount of fuel consumed by restarting the internal combustion engine.

In the above configuration, the control circuitry may be configured to set the value of the N used in the case where the rotation speed obtained when the restart was requested is higher than zero to be smaller as the rotation speed obtained when the restart was requested becomes higher.

In the above configuration, the restart of the internal combustion engine is quickly ended because of a relatively high rotation speed of the crankshaft obtained when the restart of the internal combustion engine was requested. In such a case, the mode of calculating the fuel injection amount is switched to the normal calculation process more quickly.

In the above configuration, the control circuitry may be configured to set, as the first combustion cylinder, a cylinder in which first fuel injection is allowed after the restart was requested in the case where the rotation speed obtained when the restart was requested is higher than zero, the setting being made regardless of a position of the piston obtained when the restart was requested.

For example, in the case where the rotation speed of the crankshaft obtained when the restart of the internal combustion engine was requested is zero, a process may be executed to postpone the fuel injection into the cylinders based on the positions of the pistons obtained when the restart of the internal combustion engine was requested. The above configuration prohibits execution of the postponing process and the like. This restricts situations in which due to the postponing process, the cylinder into which fuel can be injected is not treated as the first combustion cylinder.

Another aspect of the present disclosure may provide a control method for an internal combustion engine that executes various processes according to any one of the above controllers.

A further aspect of the present disclosure may provide a non-transitory computer-readable memory medium that stores a program that causes a processor to execute various processes according to any one of the above controllers.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Mechanical Configuration of Vehicle

An embodiment according to the present disclosure will now be described with reference to FIGS. 1 to 3. First, the mechanical configuration of the vehicle 100 will be described.

Figure 1:
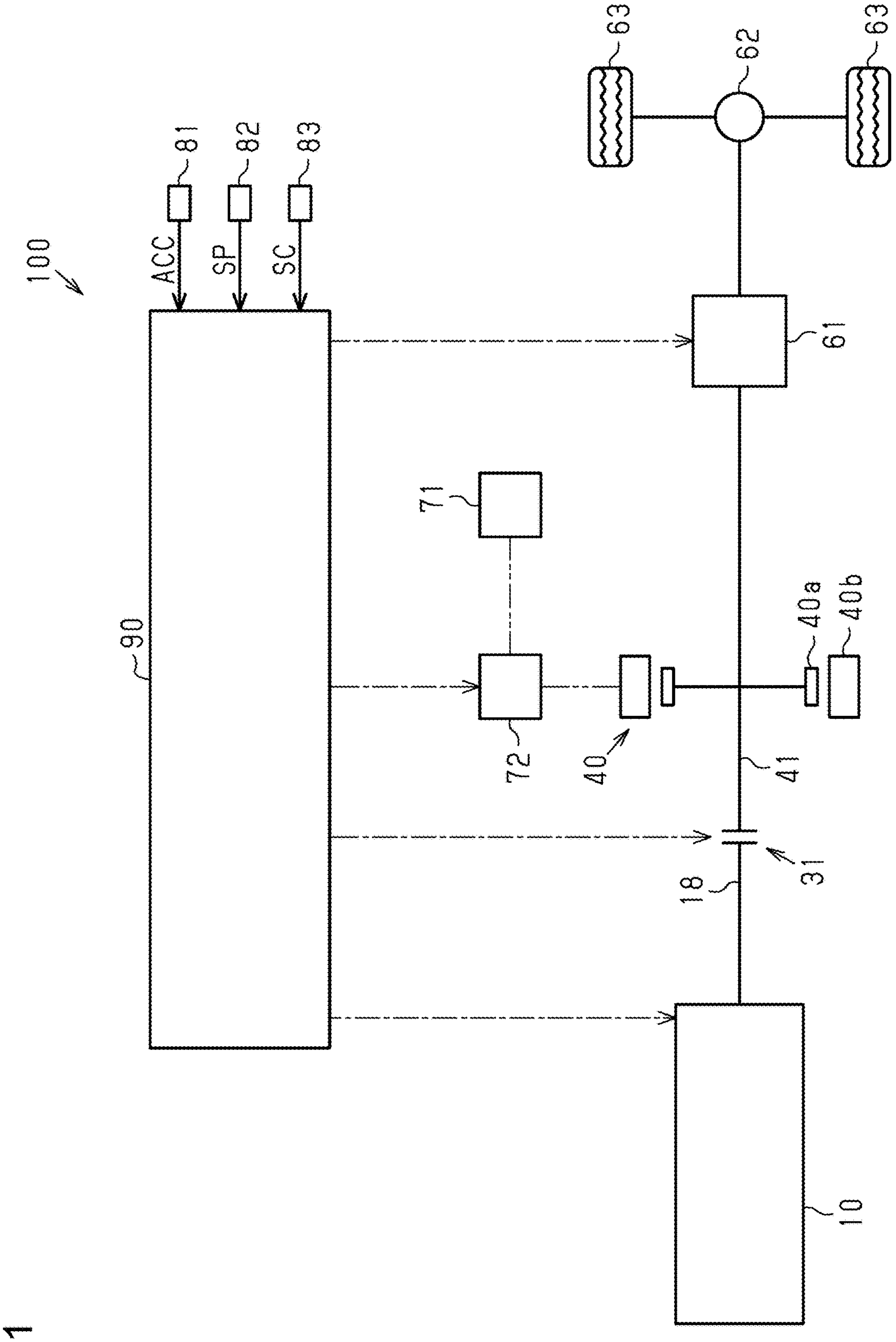
FIG. 1 is a schematic diagram showing the configuration of a vehicle.

As shown in FIG. 1, the vehicle 100 includes an internal combustion engine 10. As shown in FIG. 2, the internal combustion engine 10 includes cylinders 11, an intake passage 12, an exhaust passage 13, pistons 16, connecting rods 17, and a crankshaft 18. FIG. 2 shows one of the cylinders 11, one of the pistons 16, and one of the connecting rods 17.

Figure 2:
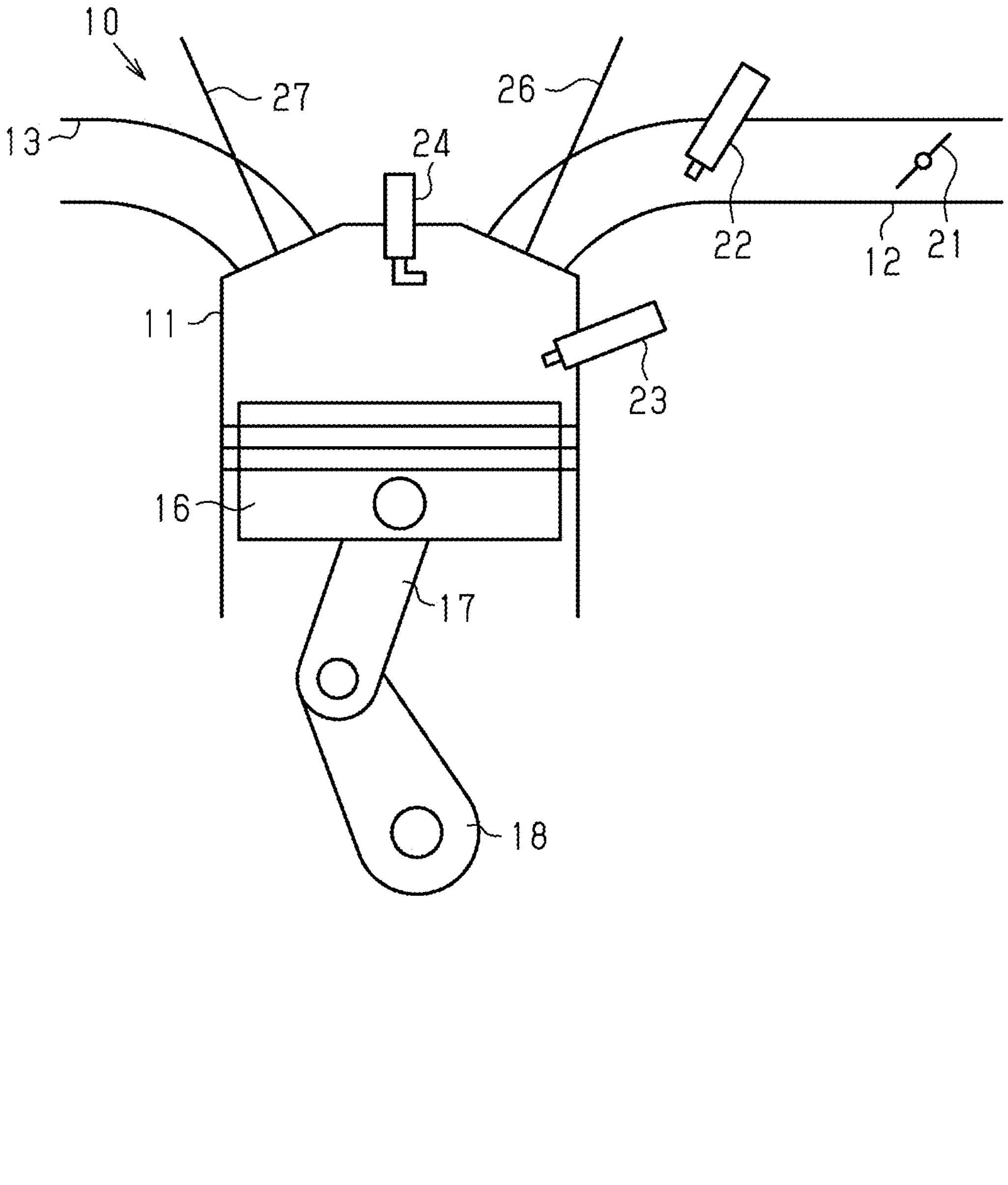
FIG. 2 is a schematic diagram showing the configuration of the internal combustion engine in FIG. 1.

As shown in FIG. 2, the cylinder 11 is a space for burning air-fuel mixture of fuel and intake air. In the present embodiment, the internal combustion engine 10 includes six cylinders 11. The internal combustion engine 10 is an inline-six cylinder engine, in which the six cylinders 11 are arranged in a line. Hereinafter, the six cylinders 11 are simply referred to as the cylinder(s) 11 when collectively described. When the six cylinders 11 are distinguished from each other, the six cylinders 11 are referred to as a first cylinder 11A, a second cylinder 11B, a third cylinder 11C, a fourth cylinder 11D, a fifth cylinder 11E, and a sixth cylinder 11F in the order in which the six cylinders 11 are arranged. FIG. 2 shows only one of the cylinders 11 as a representative cylinder.

Each piston 16 is located in the corresponding cylinder 11. The piston 16 is coupled to the crankshaft 18 by the connecting rod 17. The piston 16 reciprocates in the cylinder 11 when the air-fuel mixture of fuel and intake air burns in the cylinder 11. The reciprocating motion of the piston 16 rotates the crankshaft 18.

The intake passage 12 is connected to the cylinders 11. The intake passage 12 draws intake air into each cylinder 11 from outside of the internal combustion engine 10. The exhaust passage 13 is connected to the cylinders 11. The exhaust passage 13 discharges exhaust gas from each cylinder 11 to the outside of the internal combustion engine 10.

The internal combustion engine 10 includes a throttle valve 21, port injection valves 22, direct injection valves 23, ignition devices 24, intake valves 26, and exhaust valves 27.

The throttle valve 21 is located in the intake passage 12. The throttle valve 21 regulates the amount of intake air flowing through the intake passage 12. Each port injection valve 22 is located proximate to the corresponding cylinder 11 in the intake passage 12. The port injection valve 22 supplies fuel into the cylinder 11 through the intake passage 12 by injecting fuel into the intake passage 12. The internal combustion engine 10 includes six port injection valves 22 corresponding to the six cylinders 11. A portion including the tip of each direct injection valve 23 is located in the corresponding cylinder 11. The direct injection valve 23 supplies fuel into the cylinder 11 by injecting fuel into the cylinder 11. The internal combustion engine 10 includes six direct injection valves 23 corresponding to the six cylinders 11. In the present embodiment, the port injection valves 22 and the direct injection valves 23 are fuel injection valves that supply fuel into the cylinders 11.

A portion including the tip of each ignition device 24 is located in the corresponding cylinder 11. The ignition device 24 ignites the air-fuel mixture of fuel and intake air with a spark discharge. The internal combustion engine 10 includes six ignition devices 24 corresponding to the six cylinders 11.

The six ignition devices 24 perform ignition in the order of the first cylinder 11A, the fifth cylinder 11E, the third cylinder 11C, the sixth cylinder 11F, the second cylinder 11B, and the fourth cylinder 11D. In other words, the internal combustion engine 10 enters a combustion stroke in the order of the first cylinder 11A, the fifth cylinder 11E, the third cylinder 11C, the sixth cylinder 11F, the second cylinder 11B, and the fourth cylinder 11D. Each cylinder 11 repeats an intake stroke, a compression stroke, a combustion stroke, and a discharge stroke every two rotations of the crankshaft 18.

Each intake valve 26 is located at a downstream end of the intake passage 12. The intake valve 26 opens and closes the downstream end of the intake passage 12 with a driving force from a valve operating mechanism (not shown). The internal combustion engine 10 includes six intake valves 26 corresponding to the six cylinders 11. Each exhaust valve 27 is located at an upstream end of the exhaust passage 13. The exhaust valve 27 opens and closes the upstream end of the exhaust passage 13 with a driving force from the valve operating mechanism (not shown). The internal combustion engine 10 includes six exhaust valves 27 corresponding to the six cylinders 11.

As shown in FIG. 1, the vehicle 100 includes a clutch 31, a motor generator 40, an automatic transmission 61, a differential mechanism 62, and driven wheels 63.

The motor generator 40 includes a rotary shaft 41. The rotary shaft 41 is connected to a rotor 40*a* of the motor generator 40. Thus, the rotary shaft 41 is rotatable with respect to a stator 40*b* of the motor generator 40. The rotary shaft 41 of the motor generator 40 is connected to the crankshaft 18 of the internal combustion engine 10 by the clutch 31. The clutch 31 switches a connection state of the clutch 31 from one of an engaged state and a disengaged state to the other depending on the hydraulic pressure supplied to the clutch 31.

Further, the rotary shaft 41 of the motor generator 40 is connected to the driven wheels 63 by the automatic transmission 61 and the differential mechanism 62. The automatic transmission 61 is, for example, a stepped automatic transmission. The gear ratio of the automatic transmission 61 can be changed in stages. The differential mechanism 62 allows for a difference in the rotation speeds of the right and left driven wheels 63.

Electrical Configuration of Vehicle

As shown in FIG. 1, the vehicle 100 includes a battery 71 and an inverter 72. When the motor generator 40 functions as a power generator, the battery 71 stores electric power generated by the motor generator 40. For example, when the motor generator 40 performs regeneration, the motor generator 40 functions as a power generator. When the motor generator 40 functions as an electric motor, the battery 71 supplies electric power to the motor generator 40. For example, when the motor generator 40 performs power running, the motor generator 40 functions as an electric motor. The second inverter 72 regulates the amount of power transferred between the second motor generator 40 and the battery 71.

As shown in FIG. 1, the vehicle 100 includes an accelerator operation amount sensor 81, a vehicle speed sensor 82, and a crank angle sensor 83. The accelerator operation amount sensor 81 detects an accelerator operation amount ACC, which is an operation amount of an accelerator pedal (not shown) operated by a driver. The vehicle speed sensor 82 detects a vehicle speed SP, which is the speed of the vehicle 100. The crank angle sensor 83 detects a crank angle SC, which is an angular position of the crankshaft 18.

As shown in FIG. 1, the vehicle 100 includes a controller 90. The controller 90 obtains a signal indicating the accelerator operation amount ACC from the accelerator operation amount sensor 81. The controller 90 obtains a signal indicating the vehicle speed SP from the vehicle speed sensor 82. The controller 90 obtains a signal indicating the crank angle SC from the crank angle sensor 83. Based on the crank angle SC, the controller 90 calculates an engine rotation speed NE. The engine rotation speed NE is a rotation speed of the crankshaft 18.

Based on the accelerator operation amount ACC and vehicle speed SP, the controller 90 calculates a vehicle request driving force, which is a request value of the driving force for the vehicle 100 to travel. Based on the vehicle request driving force, the controller 90 determines a torque distribution between the internal combustion engine 10 and the motor generator 40. Based on the torque distribution between the internal combustion engine 10 and the motor generator 40, the controller 90 controls the output of the internal combustion engine 10 and controls power running and regeneration of the motor generator 40.

The controller 90 outputs a control signal to the internal combustion engine 10 to execute various controls such as regulation of the opening degree of the throttle valve 21, regulation of the amount of fuel injected from the port injection valve 22, regulation of the amount of fuel injected from the direct injection valve 23, and regulation of the ignition timing of the ignition device 24. Further, the controller 90 outputs a control signal to the inverter 72 to control the motor generator 40. Furthermore, the controller 90 uses the inverter 72 to regulate the amount of power transferred between the second motor generator 40 and the battery 71, thereby controlling the motor generator 40.

The controller 90 outputs a control signal to the clutch 31 to control the connection state of the clutch 31. The controller 90 outputs a control signal to the automatic transmission 61 to control the gear ratio of the automatic transmission 61.

The controller 90 executes an automatic stopping process that suspends the combustion of fuel in the cylinders 11 and controls the throttle valve 21 to a closed state when a predetermined stop condition is satisfied. The stop condition is, for example, that the vehicle request driving force becomes smaller than a predetermined value when the accelerator operation amount ACC becomes zero.

The controller 90 executes a postponing process when a predetermined postponing condition is satisfied during restart of the internal combustion engine 10. The postponing process is a process that postpones injecting fuel into a cylinder 11 that has entered the compression stroke at the point in time when the postponing condition was satisfied. The postponing condition is, for example, that the position of the piston 16 in the cylinder 11 that has entered the compression stroke at the point in time when the restart of the internal combustion engine 10 was requested is within a specified angle range. The specified angle range, for example, ranges from an angle advanced by several tens of degrees from the injection start timing of the direct injection valve 23 to the compression top dead center.

The controller 90 may be circuitry including one or more processors that execute various processes in accordance with a computer program (software). The controller 90 may be circuitry including one or more dedicated hardware circuits such as application specific integrated circuits (ASICs) that execute at least part of various processes or including a combination thereof. The processor includes a CPU and memories, such as a RAM and a ROM. The memory stores program codes or instructions configured to cause the CPU to execute the processes. The memory, or computer-readable medium, includes any type of medium such as a tangible or non-transitory memory medium that is accessible by general-purpose computers and dedicated computers.

Restart Control

The restart control executed by the controller 90 will now be described. The controller 90 executes the restart control when a restart of the internal combustion engine 10 is requested in a state where the internal combustion engine 10 is stopped by the automatic stopping process. The restart of the internal combustion engine 10 is requested in a case where, for example, the accelerator operation amount ACC becomes more than zero so that the vehicle request driving force becomes greater than a predetermined value.

Figure 3:
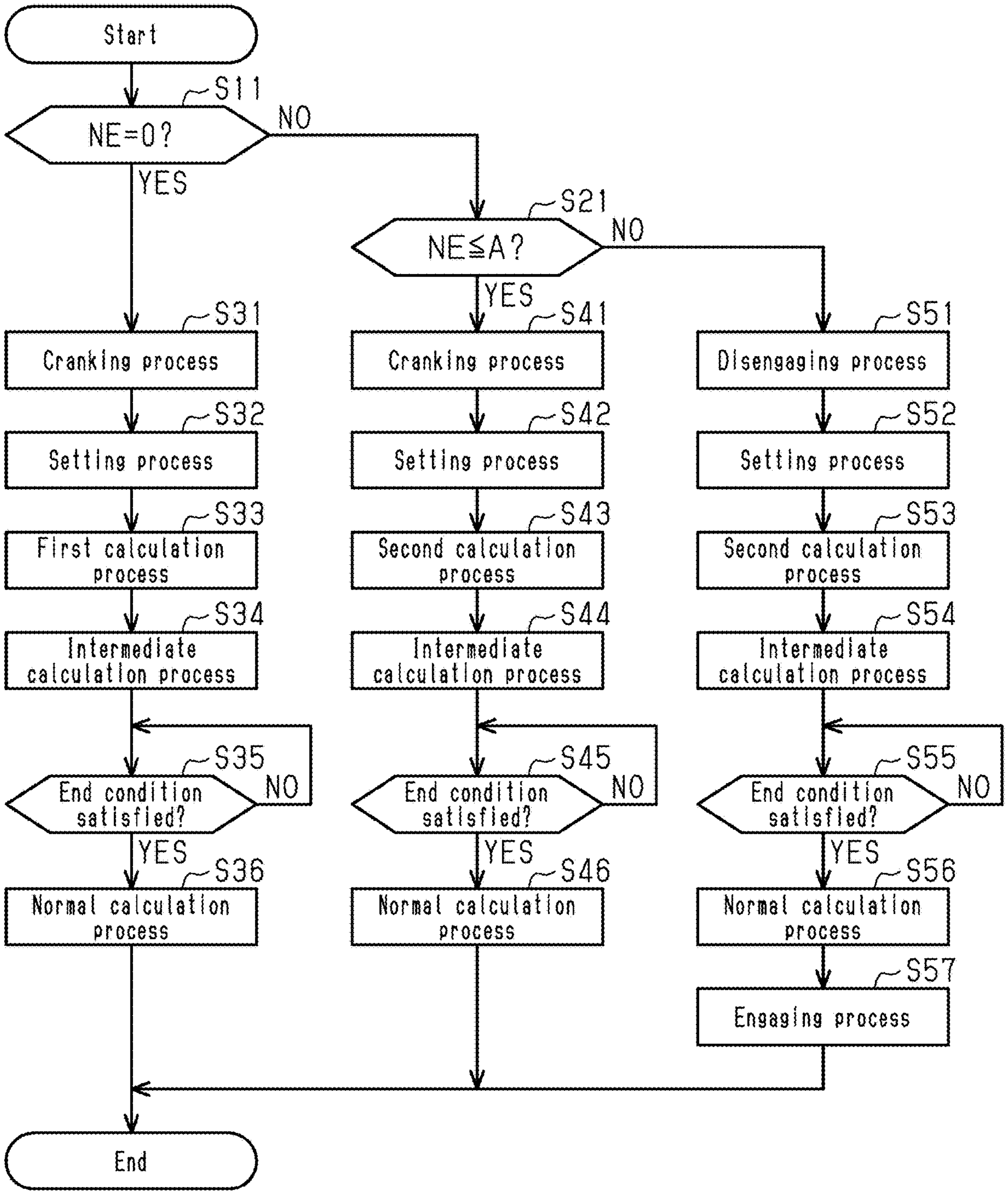
FIG. 3 is a flowchart illustrating the restart control for the internal combustion engine in FIG. 2.

As shown in FIG. 3, when starting the restart control, the controller 90 proceeds to the process of step S11. In step S11, the controller 90 determines whether the engine rotation speed NE obtained when the restart of the internal combustion engine 10 was requested is zero. In step S11, in a case where the controller 90 determines that the engine rotation speed NE obtained when the restart of the internal combustion engine 10 was requested is zero (S11: YES), the controller 90 advances the process to step S31.

In step S31, the controller 90 executes a cranking process. Specifically, the controller 90 first outputs a control signal to the clutch 31 to control the connection state of the clutch 31 to the engaged state. By outputting the control signal to the inverter 72, the controller 90 applies torque to the crankshaft 18 of the internal combustion engine 10 from the rotary shaft 41 of the motor generator 40 through the clutch 31. As a result, the engine rotation speed NE increases. That is, the controller 90 executes cranking of the internal combustion engine 10 using the motor generator 40. Then, the controller 90 advances the process to step S32.

In step S32, the controller 90 executes a setting process. Specifically, the controller 90 sets N used in an intermediate calculation process of step S34, which will be described later. Hereinafter, N is an integer greater than or equal to 2. The N used in the intermediate calculation process of step S34 is an integer greater than or equal to 3 and is a fixed value, which has been set in advance.

Further, in step S32, the controller 90 sets a first combustion cylinder. The first combustion cylinder refers to a cylinder 11 in which first combustion occurs when the internal combustion engine 10 is restarted from a state where the combustion is suspended. For example, the controller 90 generally sets, as the first combustion cylinder, a cylinder 11 that has entered the compression stroke when the restart of the internal combustion engine 10 was requested. In the present embodiment, the controller 90 permits execution of the above postponing process in a case where the engine rotation speed NE obtained when the restart of the internal combustion engine 10 was requested is zero. Thus, when executing the postponing process, the controller 90 sets, as the first combustion cylinder, a cylinder 11 that will enter the compression stroke subsequent to the cylinder 11 that has entered the compression stroke when the restart of the internal combustion engine 10 was requested. Hereinafter, the cylinder 11 in which combustion occurs subsequent to the first combustion cylinder is simply referred to as a second combustion cylinder 11. The cylinder 11 in which combustion occurs at the Nth time, with the first combustion cylinder defined as a cylinder in which combustion occurs at the first time, is simply referred to as the Nth combustion cylinder 11. Subsequent to step S32, the controller 90 advances the process to step S33.

In step S33, the controller 90 executes a first calculation process that calculates the amount of fuel injected into the first combustion cylinder based on the position of the piston 16 in the first combustion cylinder obtained when the restart of the internal combustion engine 10 was requested. For example, as the piston 16 in the initial combustion cylinder becomes closer to the top dead center, the controller 90 calculates a smaller value as the amount of fuel injected into the first combustion cylinder. The controller 90 obtains the position of the piston 16 in the first combustion cylinder based on the crank angle SC. The controller 90 controls the port injection valve 22 and the direct injection valve 23 based on the amount of fuel injected into the first combustion cylinder that has been calculated by the first calculation process. As a result, fuel is supplied to the first combustion cylinder. Thus, when the process of step S33 is executed, the engine rotation speed NE increases. Subsequent to step S33, the controller 90 advances the process to step S34.

In step S34, the controller 90 executes an intermediate calculation process that calculates the amounts of fuel injected into the second combustion cylinder 11 to Nth combustion cylinder 11. For example, as the engine rotation speed NE at the point in time when step S34 is executed increases, the controller 90 calculates smaller values of the amounts of fuel injected into the second combustion cylinder 11 to Nth combustion cylinder 11. The controller 90 controls the port injection valve 22 and the direct injection valve 23 based on the amounts of fuel injected into the cylinders 11 that have been calculated by the intermediate calculation process. As a result, fuel is supplied to the cylinders 11. Subsequent to step S34, the controller 90 advances the process to step S35.

In step S35, the controller 90 determines whether a predetermined end condition is satisfied. The end condition is, for example, that fuel has been injected into the Nth combustion cylinder 11. In step S35, when determining that the end condition is not satisfied (S35: NO), the controller 90 executes the process of step S35 again. In step S35, when determining that the end condition is satisfied (S35: YES), the controller 90 advances the process to step S36.

In step S36, the controller 90 executes a normal calculation process that calculates the amounts of fuel injected into (N+1)th and subsequent combustion cylinders. For example, as the engine rotation speed NE increases or as the above vehicle request driving force decreases, the controller 90 calculates smaller values of the amounts of fuel injected into the (N+1)th and subsequent combustion cylinders. The controller 90 controls the port injection valve 22 and the direct injection valve 23 based on the amounts of fuel injected into the cylinders 11 that have been calculated by the normal calculation process. As a result, fuel is supplied to the cylinders 11. Subsequent to step S36, the controller 90 ends the current restart control. Even after the end of the restart control, the controller 90 calculates the fuel injection amount by executing the normal calculation process.

In step S11, in a case where the controller 90 determines that the engine rotation speed NE obtained when the restart of the internal combustion engine 10 was requested is higher than zero (S11: NO), the controller 90 advances the process to step S21.

In step S21, the controller 90 determines whether the engine rotation speed NE obtained when the restart of the internal combustion engine 10 was requested is less than or equal to a specified rotation speed A, which has been set in advance. The specified rotation speed A is, for example, several hundred rpm. The specified rotation speed A is determined, for example, as follows. To restart the internal combustion engine 10, experiments or the like are first conducted to obtain a lower limit value of the engine rotation speed NE at which no cranking of the internal combustion engine 10 by the motor generator 40 is required. The specified rotation speed A is set to a value greater than the obtained lower limit value of the engine rotation speed NE by a constant rotation speed. In step S21, in a case where the controller 90 determines that the engine rotation speed NE obtained when the restart of the internal combustion engine 10 was requested is less than or equal to the specified rotation speed A (S21: YES), the controller 90 advances the process to step S41.

In step S41, the controller 90 executes the cranking process. The cranking process executed in step S41 is the same as that executed in step S31. Then, the controller 90 advances the process to step S42.

In step S42, the controller 90 executes the setting process. Specifically, the controller 90 sets N used in an intermediate calculation process of step S44, which will be described later. The N used in the intermediate calculation process of step S44 is an integer greater than or equal to 2 and is smaller than the N used in the intermediate calculation process of step S34. In other words, the value of the N used in the case where the engine rotation speed NE obtained when the restart of the internal combustion engine 10 was requested is higher than zero is smaller than the value of the N used in the case where the engine rotation speed NE obtained when the restart of the internal combustion engine 10 was requested is zero. Further, as the engine rotation speed NE obtained when the restart of the internal combustion engine 10 was requested becomes higher, the controller 90 sets the N used in the intermediate calculation process of step S44 to be smaller. In other words, the value of the N used in the case where the engine rotation speed NE obtained when the restart of the internal combustion engine 10 was requested is higher than zero becomes smaller as the engine rotation speed NE obtained when the restart of the internal combustion engine 10 was requested becomes higher.

Further, in step S42, the controller 90 sets the first combustion cylinder, in which first combustion occurs, when restarting the internal combustion engine 10 from the state where the fuel combustion is suspended in the cylinders 11. For example, the controller 90 sets, as the first combustion cylinder, a cylinder 11 that has entered the compression stroke when the restart of the internal combustion engine 10 was requested. In the present embodiment, the controller 90 prohibits execution of the postponing process in the case where the engine rotation speed NE obtained when the restart of the internal combustion engine 10 was requested is higher than zero. Thus, regardless of the postponing condition, which is used to execute the postponing process, the controller 90 sets, as the first combustion cylinder, a cylinder 11 in which first fuel injection is allowed after the restart of the internal combustion engine 10 was requested. In other words, in the case where the engine rotation speed NE obtained when the restart of the internal combustion engine 10 was requested is higher than zero, the controller 90 sets, as the first combustion cylinder, the cylinder in which first fuel injection is allowed after the request was made. In this case, the setting is made regardless of the position of the piston 16 obtained when the request was made. Subsequent to step S42, the controller 90 advances the process to step S43.

In step S43, the controller 90 executes a second calculation process that calculates the amount of fuel injected into the first combustion cylinder based on the engine rotation speed NE obtained when the restart of the internal combustion engine 10 was requested. For example, as the engine rotation speed NE increases, the controller 90 calculates a smaller value of the amount of fuel injected into the first combustion cylinder. The controller 90 controls the port injection valve 22 and the direct injection valve 23 based on the amount of fuel injected into the first combustion cylinder that has been calculated by the second calculation process. As a result, fuel is supplied to the first combustion cylinder. Thus, when the process of step S43 is executed, the engine rotation speed NE increases. Subsequent to step S43, the controller 90 advances the process to step S44.

In step S44, the controller 90 executes the intermediate calculation process, which calculates the amounts of fuel injected into the second combustion cylinder 11 to Nth combustion cylinder 11. The intermediate calculation process of step S44 is the same as that of step S34. Subsequent to step S44, the controller 90 advances the process to step S45.

In step S45, the controller 90 determines whether the predetermined end condition is satisfied. The process of step S45 is the same as that of step S35. In step S45, when determining that the end condition is not satisfied (S45: NO), the controller 90 executes the process of step S45 again. In step S45, when determining that the end condition is satisfied (S45: YES), the controller 90 advances the process to step S46.

In step S46, the controller 90 executes the normal calculation process, which calculates the amounts of fuel injected into the (N+1)th and subsequent combustion cylinders. The normal calculation process of step S46 is the same as that of step S36. Subsequent to step S46, the controller 90 ends the current restart control. Even after the end of the restart control, the controller 90 calculates the fuel injection amount by executing the normal calculation process.

In step S21, in a case where the controller 90 determines that the engine rotation speed NE obtained when the restart of the internal combustion engine 10 was requested is higher than the specified rotation speed A (S21: NO), the controller 90 advances the process to step S51.

In step S51, the controller 90 executes a disengaging process. Specifically, the controller 90 outputs a control signal to the clutch 31 to control the connection state of the clutch 31 to the disengaged state. If the connection state of the clutch 31 is the disengaged state at the point in time when the process of step S51 is executed, the controller 90 maintains that connection state of the clutch 31. Thus, after the process of step S51 is executed, no torque is applied to the crankshaft 18 from the motor generator 40. Then, the controller 90 advances the process to step S52.

In step S52, the controller 90 executes the setting process. The setting process of step S52 is the same as that of step S42. Then, the controller 90 advances the process to step S53.

In step S53, the controller 90 executes the second calculation process, which calculates the amount of fuel injected into the first combustion cylinder based on the engine rotation speed NE obtained when the restart of the internal combustion engine 10 was requested. The second calculation process of step S53 is the same as that of step S43. Likewise, the controller 90 controls the port injection valve 22 and the direct injection valve 23 based on the amount of fuel injected into the first combustion cylinder that has been calculated by the second calculation process. As a result, fuel is supplied to the first combustion cylinder. Thus, when the process of step S53 is executed, the engine rotation speed NE increases. Subsequent to step S53, the controller 90 advances the process to step S54.

In step S54, the controller 90 executes the intermediate calculation process, which calculates the amounts of fuel injected into the second combustion cylinder 11 to Nth combustion cylinder 11. The intermediate calculation process of step S54 is the same as that of step S34. Subsequent to step S54, the controller 90 advances the process to step S55.

In step S55, the controller 90 determines whether the predetermined end condition is satisfied. The process of step S55 is the same as that of step S35. In step S55, when determining that the end condition is not satisfied (S55: NO), the controller 90 executes the process of step S55 again. In step S55, when determining that the end condition is satisfied (S55: YES), the controller 90 advances the process to step S56.

In step S56, the controller 90 executes the normal calculation process, which calculates the amounts of fuel injected into the (N+1)th and subsequent combustion cylinders. The normal calculation process of step S56 is the same as that of step S36. Then, the controller 90 advances the process to step S57.

In step S57, the controller 90 executes an engaging process. Specifically, the controller 90 outputs a control signal to the clutch 31 to control the connection state of the clutch 31 to the engaged state. Then, the controller 90 ends the current restart control. Even after the end of the restart control, the controller 90 calculates the fuel injection amount by executing the normal calculation process.

Operation of Present Embodiment

For example, in the vehicle 100, the engine rotation speed NE obtained when the restart of the internal combustion engine 10 was requested may be higher than zero (S11: NO). In this case, at the point in time when the restart of the internal combustion engine 10 was requested, the throttle valve 21 was controlled to the closed state through the automatic stopping process. Generally, even when the throttle valve 21 is controlled to the closed state, a small amount of gas can flow through the intake passage 12. Further, in the internal combustion engine 10, the engine rotation speed NE is higher than zero. Thus, when each cylinder 11 repeats the intake stroke, the compression stroke, the combustion stroke, and the exhaust stroke, gas flows through the intake passage 12, the cylinder 11, and the exhaust passage 13 in this order. The gas flowing in this manner causes the pressure of gas on the downstream side of the intake passage 12, as viewed from the throttle valve 21, to tend to decrease as the engine rotation speed NE increases. As the engine rotation speed NE increases, a lower amount of intake air is drawn into the cylinder 11 from the intake passage 12. As a result, the amount of fuel to be supplied to the first combustion cylinder decreases.

Additionally, as the engine rotation speed NE obtained when the restart of the internal combustion engine 10 was requested becomes higher, the temperature in the cylinder 11 tends to increase. This causes the fuel supplied to the cylinder 11 be easily vaporized. Thus, if the temperature in the cylinder 11 increases, a decrease tends to occur in the amount of fuel collecting on the inner wall surface and the like of the cylinder 11 due to non-vaporization of fuel in the fuel supplied to the cylinder 11. As a result, the amount of fuel to be supplied to the first combustion cylinder decreases.

Advantages of Embodiment (1) In the case where the engine rotation speed NE obtained when the restart of the internal combustion engine 10 was requested is higher than zero (S11: NO), the controller 90 uses the engine rotation speed NE (S21) to execute the second calculation process (S43 or S53), which calculates the amount of fuel injected into the first combustion cylinder. Thus, the amount of fuel to be supplied to the first combustion cylinder that changes in correspondence with the engine rotation speed NE is taken into account to calculate the amount of fuel injected into the first combustion cylinder. This ensures that the restart of the internal combustion engine 10 is executed even if the engine rotation speed NE obtained when the restart of the internal combustion engine 10 was requested is higher than zero (S11: NO).

(2) For example, in the vehicle 100, if the engine rotation speed NE obtained when the restart of the internal combustion engine 10 was requested is zero (S11: YES) and the postponing condition, which is used to execute the postponing process, is not satisfied, then the cylinder 11 that has entered the compression stroke when the restart of the internal combustion engine 10 was requested is set as the first combustion cylinder. As the position of the piston 16 in the cylinder 11 that has entered the compression stroke when the restart of the internal combustion engine 10 was requested becomes closer to the top dead center, the amount of intake air in the cylinder 11 that has entered the compression stroke decreases. As a result, the amount of fuel to be supplied to the first combustion cylinder decreases.

In the case where the engine rotation speed NE obtained when the restart of the internal combustion engine 10 was requested is zero (S11: YES), the controller 90 executes the first calculation process (S33), which calculates the amount of fuel injected into the first combustion cylinder based on the position of the piston 16 in the first combustion cylinder. Thus, the amount of fuel to be supplied to the first combustion cylinder that changes depending on the position of the piston 16 in the first combustion cylinder is taken into account to calculate the amount of fuel injected into the first combustion cylinder.

(3) In the case where the engine rotation speed NE obtained when the restart of the internal combustion engine 10 was requested is zero (S11: YES), the controller 90 executes the normal calculation process (S36) subsequent to the first calculation process (S33) and the intermediate calculation process (S34). In the case where the engine rotation speed NE obtained when the restart of the internal combustion engine 10 was requested is higher than zero (S11: NO), the controller 90 executes the normal calculation process subsequent to the second calculation process and the intermediate calculation process. In the intermediate calculation process, the controller 90 calculates the amounts of fuel injected into the second combustion cylinder 11 to Nth combustion cylinder 11. The value of the N used in the case where the engine rotation speed NE obtained when the restart of the internal combustion engine 10 was requested is higher than zero (S11: NO) is smaller than the value of the N used in the case where the engine rotation speed NE obtained when the restart of the internal combustion engine 10 was requested is zero (S11: YES). Thus, the calculation mode is switched from the intermediate calculation process to the normal calculation process (S46 or S56) more quickly in the case where the engine rotation speed NE obtained when the restart of the internal combustion engine 10 was requested is higher than zero (S11: NO) than in the case where the engine rotation speed NE obtained when the restart of the internal combustion engine 10 was requested is zero (S11: YES). That is, the restart of the internal combustion engine 10 in which the amount of fuel injected is calculated to be relatively large ends quickly, so that the control of the internal combustion engine 10 is returned to normal control. This reduces the amount of fuel consumed by restarting the internal combustion engine 10.

(4) In the intermediate calculation process, as the engine rotation speed NE obtained when the restart of the internal combustion engine 10 was requested becomes higher, the value of the N used in the case where the engine rotation speed NE obtained when the restart of the internal combustion engine 10 was requested is higher than zero (S11: NO) becomes smaller. Thus, as the engine rotation speed NE obtained when the restart of the internal combustion engine 10 was requested becomes higher, the calculation mode is switched from the intermediate calculation process to the normal calculation process more quickly. In other words, when the restart of the internal combustion engine 10 is completed more quickly, the mode of calculating the amount of fuel consumed is switched to the normal calculation process more quickly.

(5) The controller 90 prohibits execution of the postponing process in the case where the engine rotation speed NE obtained when the restart of the internal combustion engine 10 was requested is higher than zero (S11: NO). Thus, in the case where the engine rotation speed NE obtained when the restart of the internal combustion engine 10 was requested is higher than zero (S11: NO), the controller 90 sets, as the first combustion cylinder, the cylinder in which first fuel injection is allowed after the request was made. This setting is made regardless of the position of the piston 16 obtained when the request was made. If the postponing process is executed, there is a possibility that the cylinder 11 in which fuel injection is allowed is not set as the first combustion cylinder. Such a situation is prevented by the above configuration.

Modifications

The present embodiment may be modified as follows. The present embodiment and the following modifications can be combined as long as the combined modifications remain technically consistent with each other.

In the above embodiment, the processing content of the restart control may be changed.

For example, the N used in the intermediate calculation process may be changed. Specifically, in step S42, the controller 90 may set the N used in the intermediate calculation process of step S44 to a fixed value regardless of the engine rotation speed NE obtained when the restart of the internal combustion engine 10 was requested. In this configuration, the value of the N used in the intermediate calculation process of step S44 is preferably smaller than the value of the N used in the intermediate calculation process of step S34.

Further, for example, in step S42, the controller 90 may set the N used in the intermediate calculation process of step S44 to the same value as the N used in the intermediate calculation process of step S34.

For example, the end conditions of steps S35, S45, and S55 may be changed. Specifically, in addition to or instead of the condition that fuel has been injected into the Nth combustion cylinder 11, the end condition of step S35 may include a condition in which the period elapsed since fuel was injected into the first combustion cylinder reaches a predetermined period, which has been set in advance. The end conditions of steps S45 and S55 may be changed in the same manner. As an alternative, the end conditions of steps S35, S45, and S55 do not have to be the same and may be different from each other.

In the above embodiment, the controller 90 does not have to execute the postponing process. That is, even in the case where the engine rotation speed NE obtained when the restart of the internal combustion engine 10 was requested is zero (S11: YES), the controller 90 may set, as the first combustion cylinder, a cylinder in which first fuel injection is allowed after the request was made. The setting is made regardless of the position of the piston 16 when the request was made.

In the above embodiment, the configuration of the vehicle 100 may be changed.

For example, the vehicle 100 does not have to include the motor generator 40. Even in this configuration, in a case where the engine rotation speed NE obtained when the restart of the internal combustion engine 10 was requested is relatively high (S21: NO), the internal combustion engine 10 can be restarted without applying torque from the motor generator 40. In the case where the engine rotation speed NE obtained when the restart of the internal combustion engine 10 was requested is zero (S11: YES), the internal combustion engine 10 can be restarted by, for example, cranking using a starter motor.

For example, the internal combustion engine 10 may include five or less cylinders 11, or may include seven or more cylinders 11. Further, for example, the internal combustion engine 10 does not have to include the port injection valves 22.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A controller for an internal combustion engine, the controller comprising control circuitry and being employed in the internal combustion engine, the internal combustion engine including cylinders in which fuel is burned, an intake passage through which intake air is drawn, an exhaust passage through which exhaust gas is discharged from the cylinders, pistons each reciprocating in a corresponding one of the cylinders, a crankshaft that rotates as the piston reciprocates, fuel injection valves each supplying a corresponding one of the cylinders with fuel, and a throttle valve located in the intake passage to regulate an amount of the intake air flowing through the intake passage, wherein the control circuitry is configured to restart the internal combustion engine from a state where fuel combustion in the cylinders is suspended, wherein the cylinders include a first combustion cylinder in which first combustion is caused by the control circuitry when the internal combustion engine is restarted from the state where the fuel combustion in the cylinders is suspended, and the control circuitry is configured to execute:

an automatic stopping process that suspends the fuel combustion in the cylinders and controls the throttle valve to a closed state when a predetermined condition is satisfied;

a first calculation process that calculates an amount of fuel injected into the first combustion cylinder based on a position of the piston in the first combustion cylinder in a case where a rotation speed of the crankshaft obtained when the restart was requested is zero; and a second calculation process that calculates the amount of fuel injected into the first combustion cylinder based on the rotation speed in a case where the rotation speed obtained when the restart was requested is higher than zero.

2. The controller for the internal combustion engine according to claim 1, wherein N is an integer greater than or equal to 2, the cylinders include a second combustion cylinder and an Nth combustion cylinder, the control circuitry is further configured to execute:

an intermediate calculation process that calculates amounts of fuel injected into the second combustion cylinder to Nth combustion cylinder when restarting the internal combustion engine; and a normal calculation process that calculates amounts of fuel injected into (N+1)th and subsequent combustion cylinders, and the control circuitry is configured to set a value of the N used in the case where the rotation speed obtained when the restart was requested is higher than zero to be smaller than a value of the N used in the case where the rotation speed obtained when the restart was requested is zero.

3. The controller for the internal combustion engine according to claim 2, wherein the control circuitry is configured to set the value of the N used in the case where the rotation speed obtained when the restart was requested is higher than zero to be smaller as the rotation speed obtained when the restart was requested becomes higher.

4. The controller for the internal combustion engine according to claim 1, wherein the control circuitry is configured to set, as the first combustion cylinder, a cylinder in which first fuel injection is allowed after the restart was requested in the case where the rotation speed obtained when the restart was requested is higher than zero, the setting being made regardless of a position of the piston obtained when the restart was requested.

5. A control method for an internal combustion engine, the control method being employed in the internal combustion engine, the internal combustion engine including cylinders in which fuel is burned, an intake passage through which intake air is drawn, an exhaust passage through which exhaust gas is discharged from the cylinders, pistons each reciprocating in a corresponding one of the cylinders, a crankshaft that rotates as the piston reciprocates, fuel injection valves each supplying a corresponding one of the cylinders with fuel, and a throttle valve located in the intake passage to regulate an amount of the intake air flowing through the intake passage, the control method comprising:

restarting the internal combustion engine from a state where fuel combustion in the cylinders is suspended, wherein the cylinders include a first combustion cylinder in which first combustion occurs when the internal combustion engine is restarted from the state where the fuel combustion in the cylinders is suspended;

suspending the fuel combustion in the cylinders and controlling the throttle valve to a closed state when a predetermined condition is satisfied;

calculating an amount of fuel injected into the first combustion cylinder based on a position of the piston in the first combustion cylinder in a case where a rotation speed of the crankshaft obtained when the restart was requested is zero; and calculating the amount of fuel injected into the first combustion cylinder based on the rotation speed in a case where the rotation speed obtained when the restart was requested is higher than zero.

6. A non-transitory computer-readable memory medium storing a program that causes a processor to execute a control process for an internal combustion engine, the internal combustion engine including cylinders in which fuel is burned, an intake passage through which intake air is drawn, an exhaust passage through which exhaust gas is discharged from the cylinders, pistons each reciprocating in a corresponding one of the cylinders, a crankshaft that rotates as the piston reciprocates, fuel injection valves each supplying a corresponding one of the cylinders with fuel, and a throttle valve located in the intake passage to regulate an amount of the intake air flowing through the intake passage, the control process comprising:

restarting the internal combustion engine from a state where fuel combustion in the cylinders is suspended, wherein the cylinders include a first combustion cylinder in which first combustion occurs when the internal combustion engine is restarted from the state where the fuel combustion in the cylinders is suspended;

suspending the fuel combustion in the cylinders and controlling the throttle valve to a closed state when a predetermined condition is satisfied;

calculating an amount of fuel injected into the first combustion cylinder based on a position of the piston in the first combustion cylinder in a case where a rotation speed of the crankshaft obtained when the restart was requested is zero; and calculating the amount of fuel injected into the first combustion cylinder based on the rotation speed in a case where the rotation speed obtained when the restart was requested is higher than zero.

* * * * *